(12) United States Patent
Banerjee

(10) Patent No.: US 7,394,377 B2
(45) Date of Patent: Jul. 1, 2008

(54) RFID EDGE SERVER WITH SECURITY PLUG-INS

(75) Inventor: Ashok Banerjee, Fremont, CA (US)

(73) Assignee: BEA Systems, Inc., San Jose, CA (US)

( * ) Notice: Subject to any disclaimer, the term of this patent is extended or adjusted under 35 U.S.C. 154(b) by 318 days.

(21) Appl. No.: 11/256,767

(22) Filed: Oct. 24, 2005

(65) Prior Publication Data

US 2007/0044095 A1 Feb. 22, 2007

Related U.S. Application Data

(60) Provisional application No. 60/721,023, filed on Sep. 27, 2005, provisional application No. 60/710,243, filed on Aug. 22, 2005.

(51) Int. Cl.
G08B 13/14 (2006.01)
(52) U.S. Cl. .................. 340/572.1; 340/10.1; 340/10.3; 717/176
(58) Field of Classification Search ................ 340/10.1, 340/572.1, 572.7, 10.3; 717/176, 120; 235/375; 709/220; 370/428; 705/30, 9
See application file for complete search history.

(56) References Cited

U.S. PATENT DOCUMENTS

| 6,317,028 | B1 | 11/2001 | Valiulis |
| 6,854,069 | B2 | 2/2005 | Kampe et al. |
| 6,874,020 | B1 | 3/2005 | Da Palma et al. |
| 7,051,105 | B2 | 5/2006 | Lauzon et al. |
| 7,062,540 | B2 | 6/2006 | Reddy et al. |
| 7,317,394 | B2 * | 1/2008 | Koh et al. ................. 340/572.1 |
| 2003/0043042 | A1 | 3/2003 | Moores, Jr. et al. |
| 2003/0144926 | A1 | 7/2003 | Bodin et al. |
| 2004/0087273 | A1 | 5/2004 | Perttila et al. |
| 2004/0138989 | A1 | 7/2004 | O'Malley et al. |
| 2006/0209868 | A1 * | 9/2006 | Callaghan ................... 370/428 |
| 2007/0027966 | A1 * | 2/2007 | Singhal et al. .............. 709/220 |

OTHER PUBLICATIONS

International Search Report for PCT/US06/02640, dated Dec. 9, 2007, 10 pages.

* cited by examiner

Primary Examiner—Anh V La
(74) Attorney, Agent, or Firm—Fliesler Meyer LLP

(57) ABSTRACT

An RFID edge server using an application server allows for improvements in an RFID system.

9 Claims, 14 Drawing Sheets

RFID EDGE SERVER WITH SECURITY PLUG-INS

CLAIM OF PRIORITY

This application claims priority to U.S. Provisional Application No. 60/710,243 entitled "RFID Edge Server" by Ashok Banerjee, filed Aug. 22, 2005 and U.S. Provisional Application No. 60/721,023 entitled "RFID Edge Server with Security Plug-Ins and WSRM" by Ashok Banerjee, filed Sep. 27, 2005.

BACKGROUND OF INVENTION

The present invention relates to Radio Frequency Identification (RFID) technology. Radio Frequency Identification technology is becoming more and more important, especially to manage supply chains.

Radio Frequency Identification technology can allow for the tracking of objects using RFID tags and RFID readers. RFID readers can interrogate the RFID tags using radio waves. The RFID tag typically includes an antenna and a microchip that stores a response code. The majority of RFID tags use a silicon microchip to store a unique serial number, such as an electronic product code (EPC), and usually some additional information. The reader can pass the response code to a computer system to track the objects.

There are two main categories of RFID systems, passive and active systems. Passive RFID tags do not have a transmitter but simply reflect back energy to the reader. Active tags have their own transmitter and power source, such as a battery. Active RFID systems are typically used for a tracking large items since the active RFID tags are relatively expensive.

Because passive RFID tags do not use a power source and transmitter, they tend to be cheaper than the active RFID tags. Retailers and manufacturers are adding the passive tags to items in the supply chain. RFID systems can significantly reduce the cost of managing inventory.

Passive RFID tags allow for the possibility of tracking of cartons of materials as they enter and exit entry points of a warehouses and stores. As the passive RFID tags become cheaper, ultimately individual packages can have their own RFID tags and thus the inventory can be tracked very precisely. Additionally, since the RFID technology does not rely on line-of-sight operation, a shopping cart full of goods with RFID tags can be scanned without requiring the goods to be removed from the cart.

In one embodiment, RFID tags can be used to implement an electronic product code (EPC). The EPC is a unique number used to identify specific objects in the supply chain. EPC information services (EPCIS) can enable users to exchange EPC related data with trading partners throughout the EPC network.

DETAILED DESCRIPTION

Figure 1:
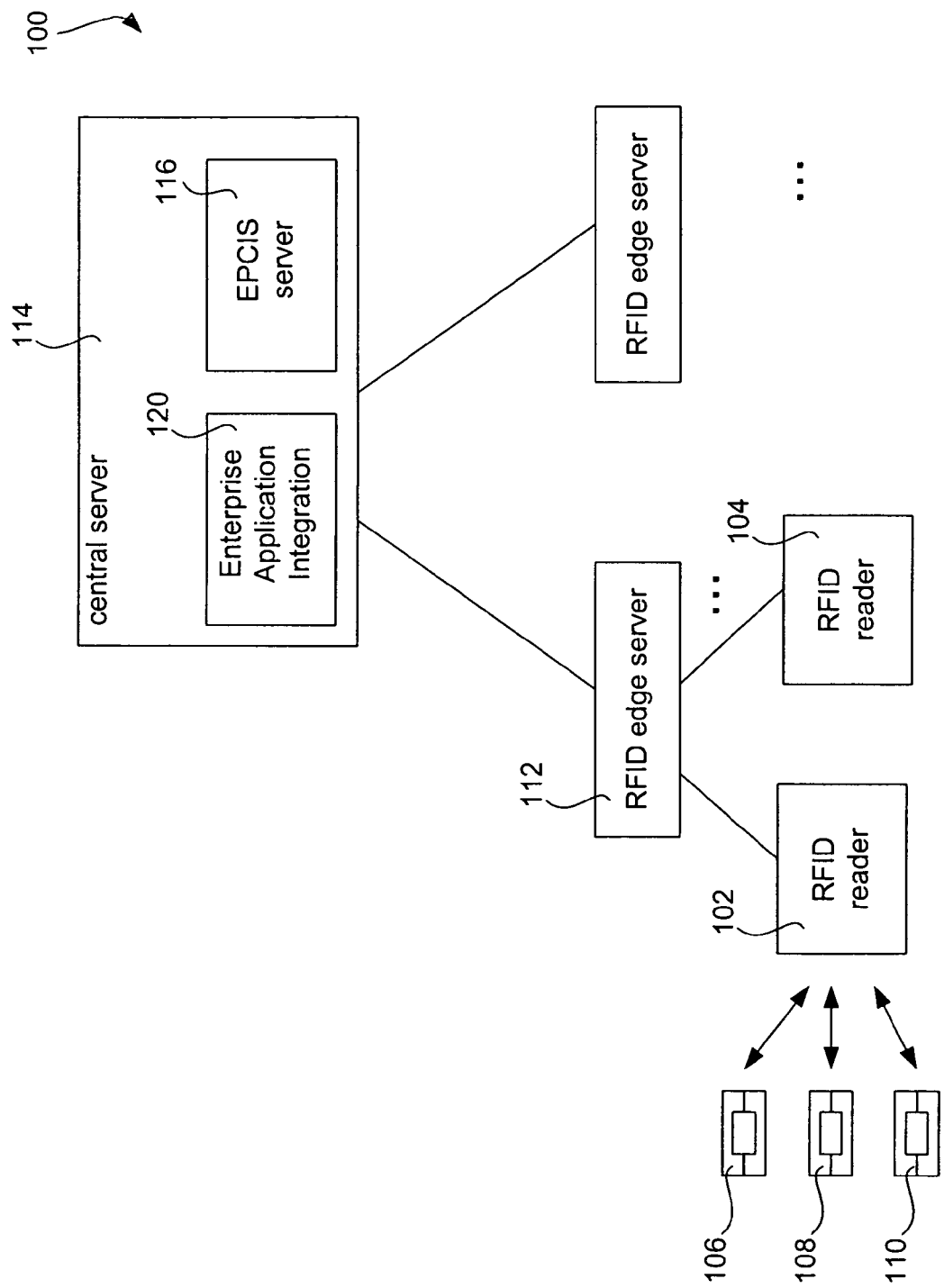
FIG. 1 is a diagram of an RFID system of one embodiment.

FIG. 1 illustrates a RFID system 100. RFID readers 102 and 104 can be used to interrogate RFID tags 106, 108 and 110. Data from the RFID tags, such as EPC codes, can be read by the RFID reader and provided to an RFID edge server 112. Typically, the RFID readers 102 and 104 are constantly interrogating for responses from the RFID tags 106, 108 and 110. The RFID edge server 112 can thus receive a large number of duplicative responses. RFID edge server 112 can send event reports to the central server 114. The central server 114 can include a EPCIS server 116 and enterprise application integration software 120.

The RFID edge server can be used to provide RFID reader management, filtering, commissioning, and connectivity. As disclosed below, in one embodiment the RFID edge server 102 can include application server, such as a J2EE application server. J2EE applications servers can run J2EE applications. J2EE applications can be made up of components. A J2EE component can be a self-contained functional software unit that is assembled into a J2EE application with its related classes and files and that communicates with other components. The J2EE specification defines the following J2EE components:

Application clients and applets are components that run on the client.

Java Servlet and JavaServer Pages™ (JSP™) technology components are web components that run on the server.

Enterprise JavaBeans™ (EJB™) components (enterprise beans) are business components that run on the server.

J2EE components can be written in the Java programming language and can be compiled in the same way as any program in the language. In one embodiment, The difference between J2EE components and "standard" Java classes is that J2EE components are assembled into a J2EE application, are verified to be well formed and in compliance with the J2EE specification, and are deployed to production, where they are run and managed by the J2EE server.

In one embodiment, the application server is the WebLogic Server™ available from BEA Systems, Inc., of San Jose, Calif.

The application server can run a RFID edge server infrastructure itself as a J2EE application. RFID edge server application can include J2EE components and be packaged in an archive file such as a (Java Archive) JAR file or a Web Archive (WAR) file.

The use of an application server at the RFID edge server can provide a number of advantages. The application server components can include:

- Java Messaging Server (JMS) to provide guaranteed message delivery and once message processing.
- Security to prevent unauthorized access. The security module can be able to plug into 3$^{rd}$ party software and can utilize the secured socket layer (SSL) protocol.
- Administration to manage the RFID edge server. Administration can include JMX administration and can be able to aggregate views and configure the RFID edge server.
- Web services to receive and respond to web service requests.

The RFID edge server can provide for RFID data filtering and business rules. The RFID edge server can work with a variety of RFID readers. Applications can interact with an RFID edge server through an Application-Level Events (ALE) interface. ALE can provide a way for developers to define high-level events that are needed by specific customer enterprise applications. Enterprise applications receive incoming data in formats designed for easy integration and can obtain RFID data without requiring programmers to interact directly with RFID readers or to perform any low-level real-time processing or scheduling.

Figure 10:
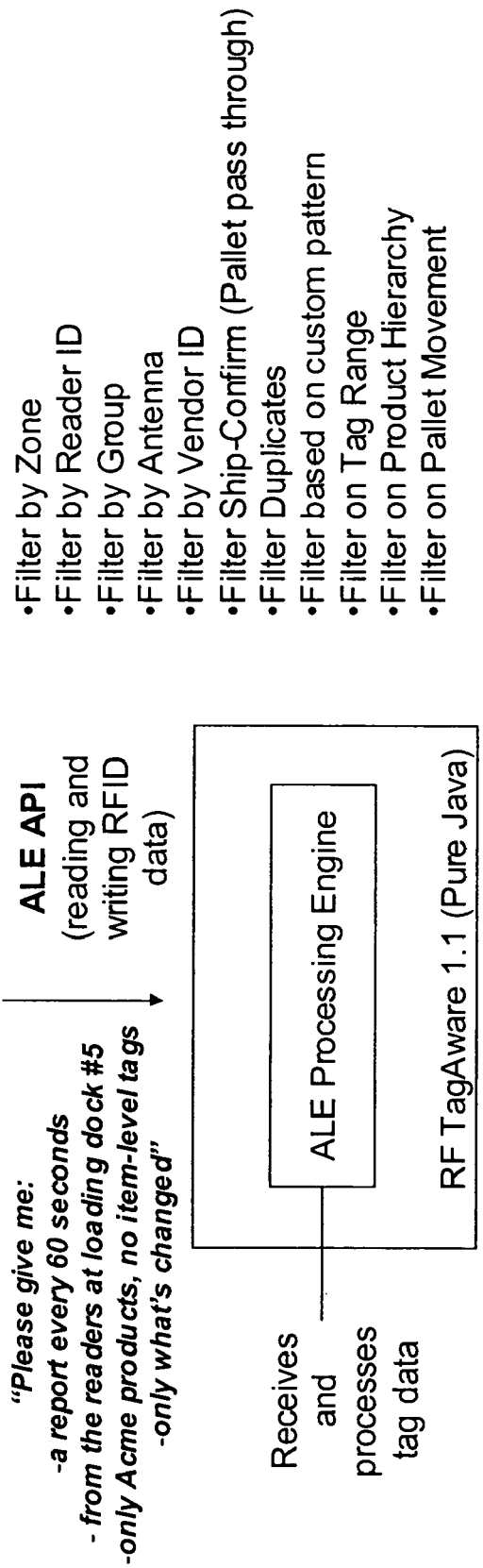
FIG. 10 is a diagram that illustrates an ALE processing engine.

FIG. 10 illustrates an ALE processing engine that can be run at an application server at an RFID edge server. FIG. 10 also shows common ALE filters.

Application-Level Events (ALE) defines an interface through which an application could indicate exactly what information it wants from the raw stream of RFID reads. Through ALE, an application can specify a number of things:
- Which locations it wants to read from
- What interval of time to accumulate data
- How to filter the data
- How to group the results
- Whether to report currently visible tags or just additions or deletions
- Whether to report actual EPCs or just a count of the tags that are read.

A request of this kind may be made in an on-demand mode, where the reads are performed in response to an application request, or as a standing request, where data is sent to the application periodically without further request.

An RFID application can make a high-level request for data through the ALE interface, and the hardware or software on the other side of the ALE interface fulfills the request. ALE shields applications from low-level implementation detail.

Another benefit for end users is that ALE facilitates sharing RFID data among many applications simultaneously. Different applications may make requests through the ALE interface, without requiring those applications to have knowledge of each other. If two applications request data from the same reader, the implementation of ALE mediates those requests and makes sure that each application receives the data it needs. Using ALE each RFID can interact with a number of applications rather than be just a dedicated peripheral for a specific application.

The EPC Information Service (EPCIS) is a specification for a standard interface for accessing EPC-related information. Because an Electronic Product Code (EPC) gives each object a unique serial number, each individual object can be tracked independently and fine-grained real-time information about each individual object can be collected, stored and acted upon. EPC Information Services are a way for supply chain partners to share and exchange information efficiently, because a standard interface allows trading partners to use the same functions or methods for querying data across the supply chain, leading to reduced times integrating with partners if everyone uses the same interface, even though they may store the information in different types of underlying databases.

EPC Information Service is a technical specification for a data communication interface. EPC Information Services are designed to support both on-demand polling access and a 'push' model supporting standing queries. Depending on how the security for each individual EPCIS implementation is configured, you might be granted the right to define your own standing queries—or you might only have the option of 'subscribing' to an existing query which was pre-defined by the owner or provider of a particular EPCIS service.

EPC-Related Data can Include:
1. timestamped event data collected throughout the life-cycle of an object e.g. Observations (low-level tag readings), Measurements (sensor data, e.g. temperature history), Containment History, Higher-level Location History, Associations with Business Transactions.
2. quasi-static attributed data defined at serial-level but not continuously updated e.g. Date of Manufacture, Date of Expiry, Custom Configuration etc.

The EPC Information Service lies at the top layer of the EPC Network technology stack. EPCIS can allow business logic to be mixed with read 'events' coming from RFID readers. The layers underneath EPCIS (e.g. Filtering & Collection [ALE], Reader Protocol etc.) can be primarily concerned with simple triples of data (Reader, Tag EPC, timestamp). EPCIS allows for higher-level meanings to be stored or accessed, involving business processes and business transactions.

The EPC Information Service Specification can specify the standard interfaces for:
- Query (getting data from an EPCIS)
- Capture (putting data into an EPCIS)

The EPCIS interface can be implemented as an EPCIS server. In terms of implementing an EPC Information Service, you can choose to either host your own EPCIS interface coupled to your existing databases for serial level data or subscribe to a technology solution provider hosting a managed EPCIS service.

Trading partners may be able to find an EPCIS by using the Object Name Service (ONS), doing a lookup based on the EPC of your products. Serial-level pointers can also be stored securely within registries called Discovery Services. Discovery Service registries can be updated by each custodian on handover, with serial-level EPC lookup.

Figure 11:
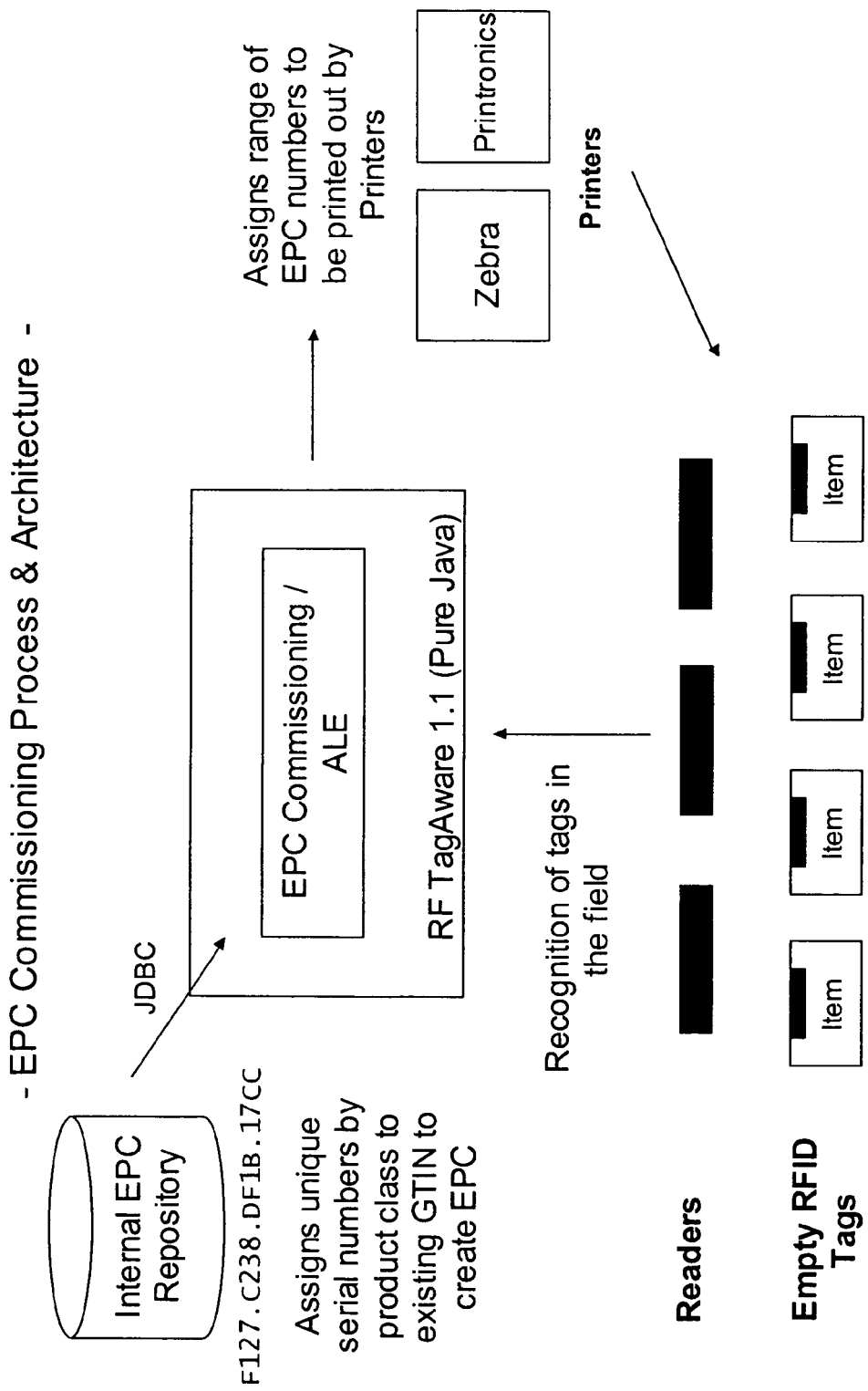
FIG. 11 is a diagram that illustrates the EPC commissioning process.

FIG. 11 shows an example of EPCIS commissioning as a J2EE application that can run on an application server at an application server at an EPCIS server. Alternately, some of the EPCIS functions can be run at an application server at an RFID edge server.

Figure 2:
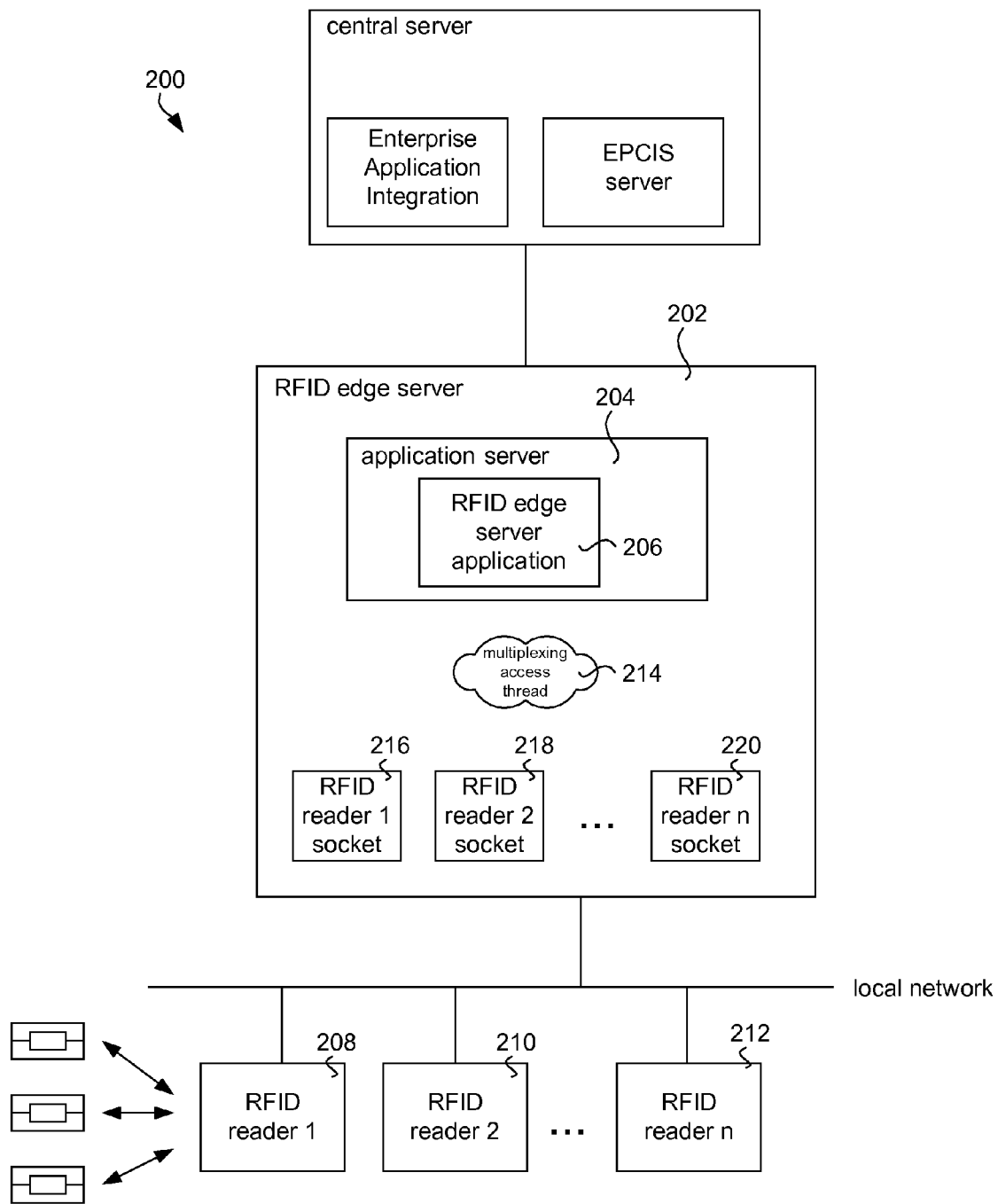
FIG. 2 is a diagram of an RFID edge server using non blocking IO for reading RFID reader data.

FIG. 2 illustrates an example of a system 200 in which the RFID edge server 202 includes an application server 204 running an RFID edge server application 206. The RFID edge server application 206 can be written in a language such as Java. In one embodiment, the RFID edge server application 206 is written in Java, and the application server 204 is J2EE compliant.

The RFID edge server 202 can have a TCP/IP socket for each of the RFID readers, or each active RFID readers. One way of connecting the RFID edge server 202 with the RFID readers 208, 210 and 212 is to have a dedicated thread for monitoring each socket. In one embodiment, the number of RFID readers, n, can be quite large. It is feasible for large warehouses to have over a hundred RFID readers. For this reason, the RFID edge server 202 can be input/output (I/O) constrained. Each of the access threads needs to access a CPU and other Operating System Resources which require a certain amount of setup for each access thread. The switching between a large number of threads can limit the number of RFID readers that can be associated with an RFID edge server.

As shown in FIG. 2, in one embodiment, the RFID edge server 202 is associated with multiple RFID readers 208, 210 and 212. RFID edge server 202 can include an application server 204 to run applications, such as the RFID edge server application 206. The RFID edge server 202 can have TPC/IP socket connections 216, 218 and 220 with multiple RFID readers 208, 210 and 212. The RFID edge server 202 can have fewer access threads 214 for the RFID readers than there are socket connections.

Each data access thread can be used to service multiple sockets. In one embodiment, at least some of the access threads 214 are written in a non-Java language. For example, the access thread 214 can be written in code that is native to the machine.

The operating system for the machine running the application server 204 can be such that it will provide TPC/IP socket information to access thread 214 which can then be provided to the application server 204 for use by the RFID edge server application 206. Alternately, the operation for the machine can allow the application server 204 to obtain the low level control of the TPC/IP sockets using the access thread 214.

In one embodiment, the RFID readers 208, 210 and 214 are connected to the RFID edge server 202 through the local network 222. The TPC/IP protocol can be used for interconnecting between the RFID edge server 202 and RFID readers 208, 210 and 212.

In one embodiment, the system can use sockets which are serviced by multiplexed reader/accessor threads. Muxer sockets can support asynchronous network I/O for the upper protocol layers via a completion based contract. In one embodiment, Protocol layers can implement MuxableSocket as a completion callback and register it with the muxers (via SocketMuxer.register). It can then issue asynchronous read requests to the muxers (via SocketMuxer.read). Under the covers, muxers can perform the network input operations either asynchronously (for OS which supports asynchronous IO, e.g. I/O completion port on Win2K), or in a non-blocking fashion (for OS which supports non-blocking I/O, e.g. select/poll on Unix platforms, or the JDK 1.4 non-blocking I/O API, which is modeled closely after the select API), or synchronously with polling. To avoid undue copying, data can be read into protocol layers' buffer directly). When the read operation is completed, the muxer can notify the protocol layer via the completion callback (MuxableSocket.dispatch). In the event of any network errors or end of file or timeout reached for the socket, the muxer can notify the protocol layer via an error handler (MuxableSocket.hasException/endOfStream).

In one embodiment the number of access threads used is fixed. The number of or, default number of, access threads can be proportional to the number of CPUs of the machine running the RFID edge server. In one exemplary embodiment, there are two access threads per CPU to access the sockets of the RFID readers.

Figure 3:
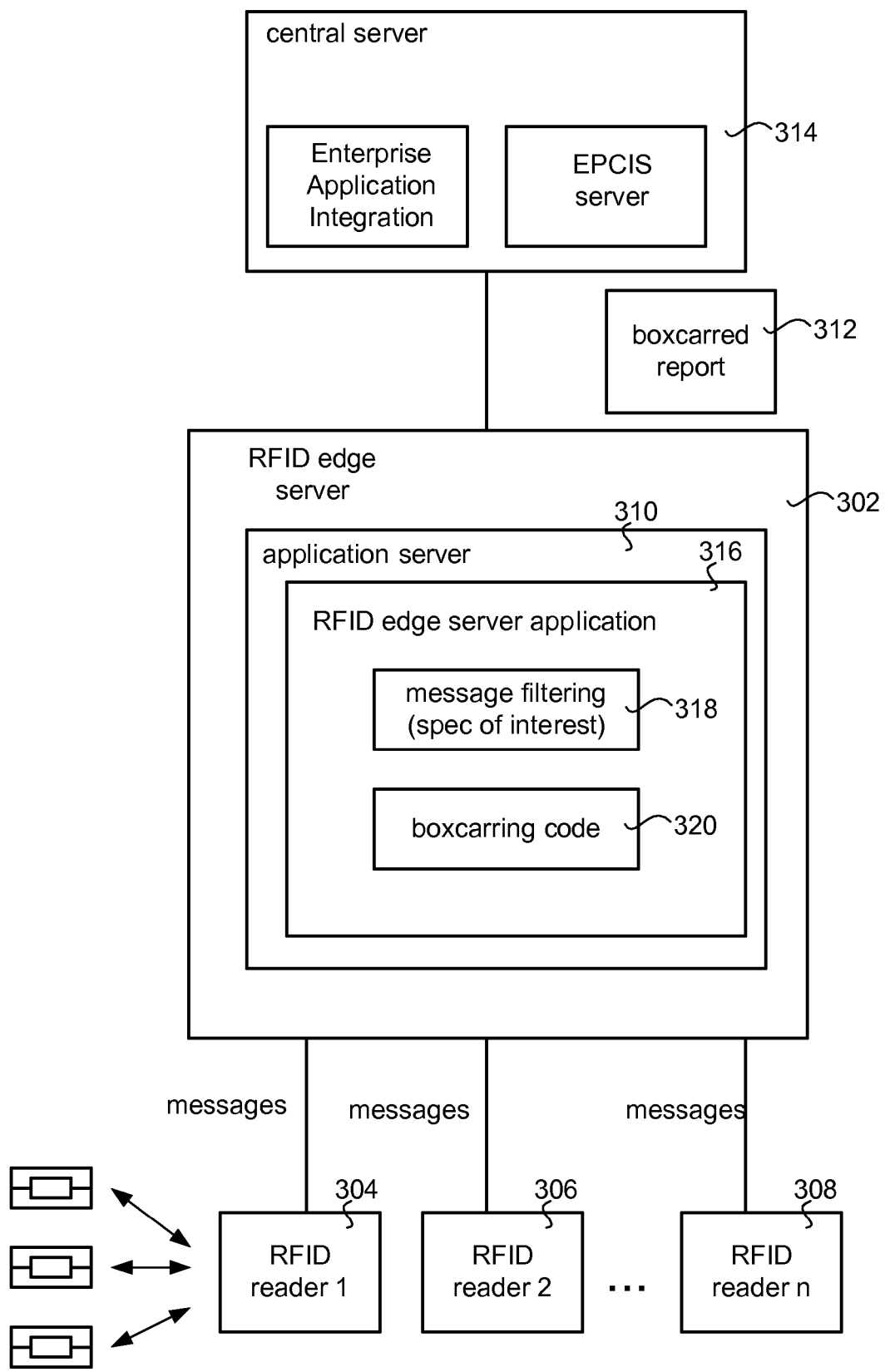
FIG. 3 is a diagram illustrating the use of message filtering and event boxcarring at the RFID edge server.
Figure 4:
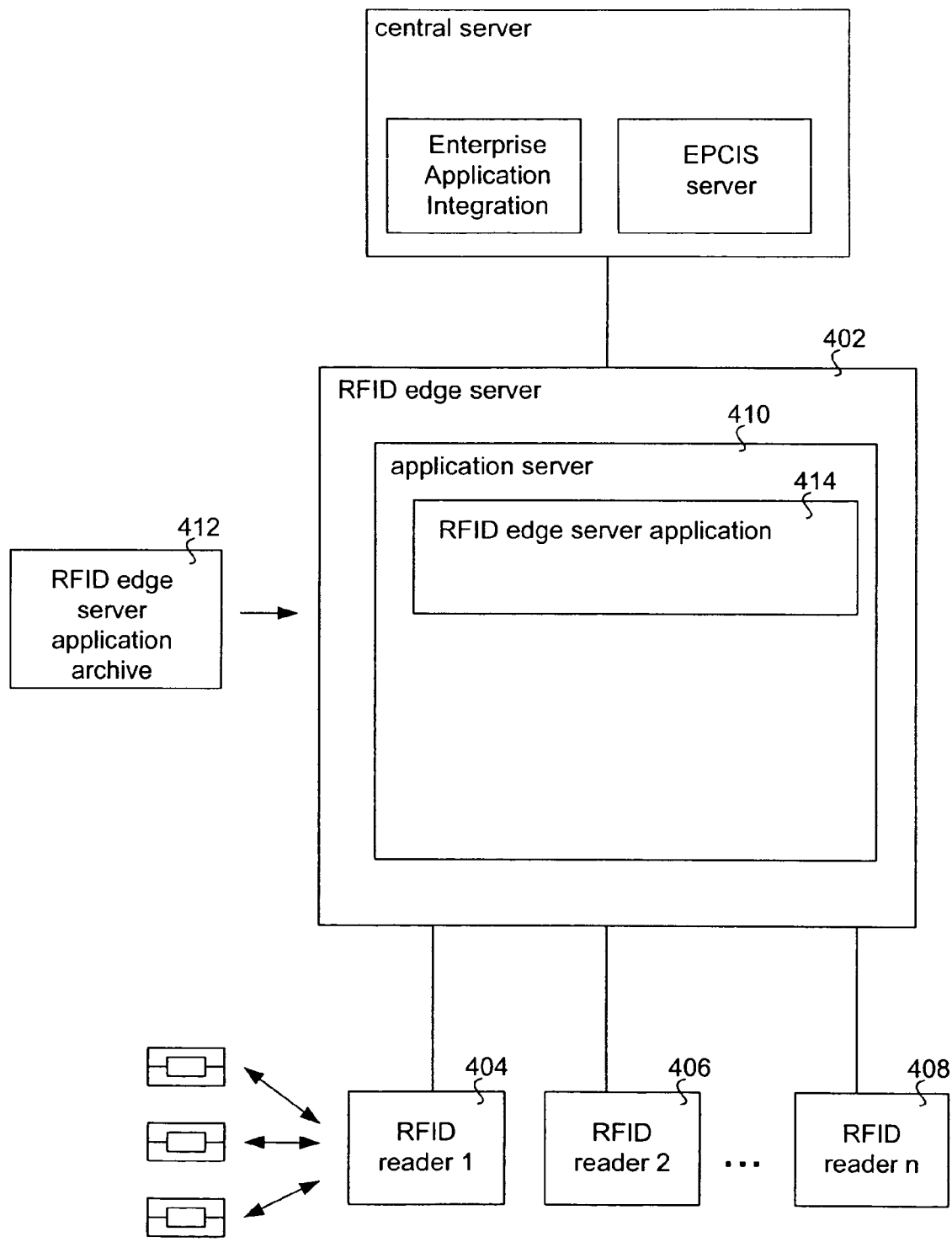
FIG. 4 is a diagram that illustrates the use of an archive to store and create a deployable unit of the RFID edge server itself to be deployed as an application and allow it to be quickly deployed into a standard web server.

FIG. 3 illustrates a RFID edge server 302 used to associate with multiple RFID readers 304, 306 and 308 at a location. The RFID edge server 302 can include an application server 310 which can be adapted to filter communications from the readers 304, 306 and 308 and to boxcar event reports 312 to a central server 314.

In one embodiment, the RFID edge server 302 can have a RFID edge server application running 316 which can include message filtering 318 and boxcar code 320. In one embodiment, messages are received by the RFID edge server. The RFID edge server application 316 can filter away duplicate or otherwise unnecessary reports. In one embodiment, the reports can be boxcarred, that is multiple event reports can be combined together into a single message from the RFID edge server 302 to the central server 314. This can reduce the amount of traffic between the RFID edge server 302 and the central server 314, and thus increase the number of RFID edge servers that can interact with the central server 314. The boxcarred reports can include data from messages provided by the RFID readers 304, 306 and 308. The central server 314 can unboxcar the messages. A boxcarring protocol at the RFID edge servers and at the central servers that ensures the correct boxcarring and unboxcarring of the messages.

One embodiment of the present invention is a method wherein at the RFID edge server 302, messages are received from RFID readers 304, 306 and 308. The messages are filtered at the RFID edge server 302. Event reports can be boxcarred, which can include the data from the messages and sent to the central server 314.

A computer readable media including code adapted to do the above method can also be used. This code can be part of the RFID edge server application 316 running on the application server 312 of the RFID edge server 302.

An RFID edge server 402 can be associated with multiple RFID readers 404, 406 and 408. The RFID edge server 402 can include an application server 410 adapted to receive an RFID software package as an archive file 412. The application server 410 can open an archive file 412 to install the RFID software 414 into the application server 410. In one embodiment, the archive file is a J2EE standard archive file, such as a JAR file (Java Archive).

The Java™ Archive (JAR) file format can enable the bundling of multiple files into a single archive file. Typically, a JAR file will contain the class files and auxiliary resources associated with applets and applications. The JAR file format can provide many benefits:

Security: The contents of a JAR file can be signed. Users who recognize your signature can then optionally grant your software security privileges it wouldn't otherwise have.

Decreased download time: If an applet is bundled in a JAR file, the applet's class files and associated resources can be downloaded to a browser in a single HTTP transaction without the need for opening a new connection for each file.

Compression: The JAR format allows you to compress your files for efficient storage.

Packaging for extensions: The extensions framework provides a means by which you can add functionality to the Java core platform, and the JAR file format defines the packaging for extensions.

Package Sealing: Packages stored in JAR files can be optionally sealed so that the package can enforce version consistency. Sealing a package within a JAR file means that all classes defined in that package must be found in the same JAR file.

Package Versioning: A JAR file can hold data about the files it contains, such as vendor and version information.

Portability: The mechanism for handling JAR files is a standard part of the Java platform's core API.

The RFID edge server application archive 412 can be provided from a website which can be downloaded into the application server 410 of the RFID edge server 402. The archive file can include large number of other files, such as classes and binaries needed to run an RFID edge server application. The RFID edge server archive 412 can make it easier to obtain and maintain the RFID software 414.

One embodiment of the present invention is a method wherein at the RFID edge server 402, RFID software packaged in an archive file 412 is received. At the RFID edge server 402, the archive file can be opened to install the RFID software 414 into the application server 410. A computer readable medium implementing this method can also be used.

Figure 5:
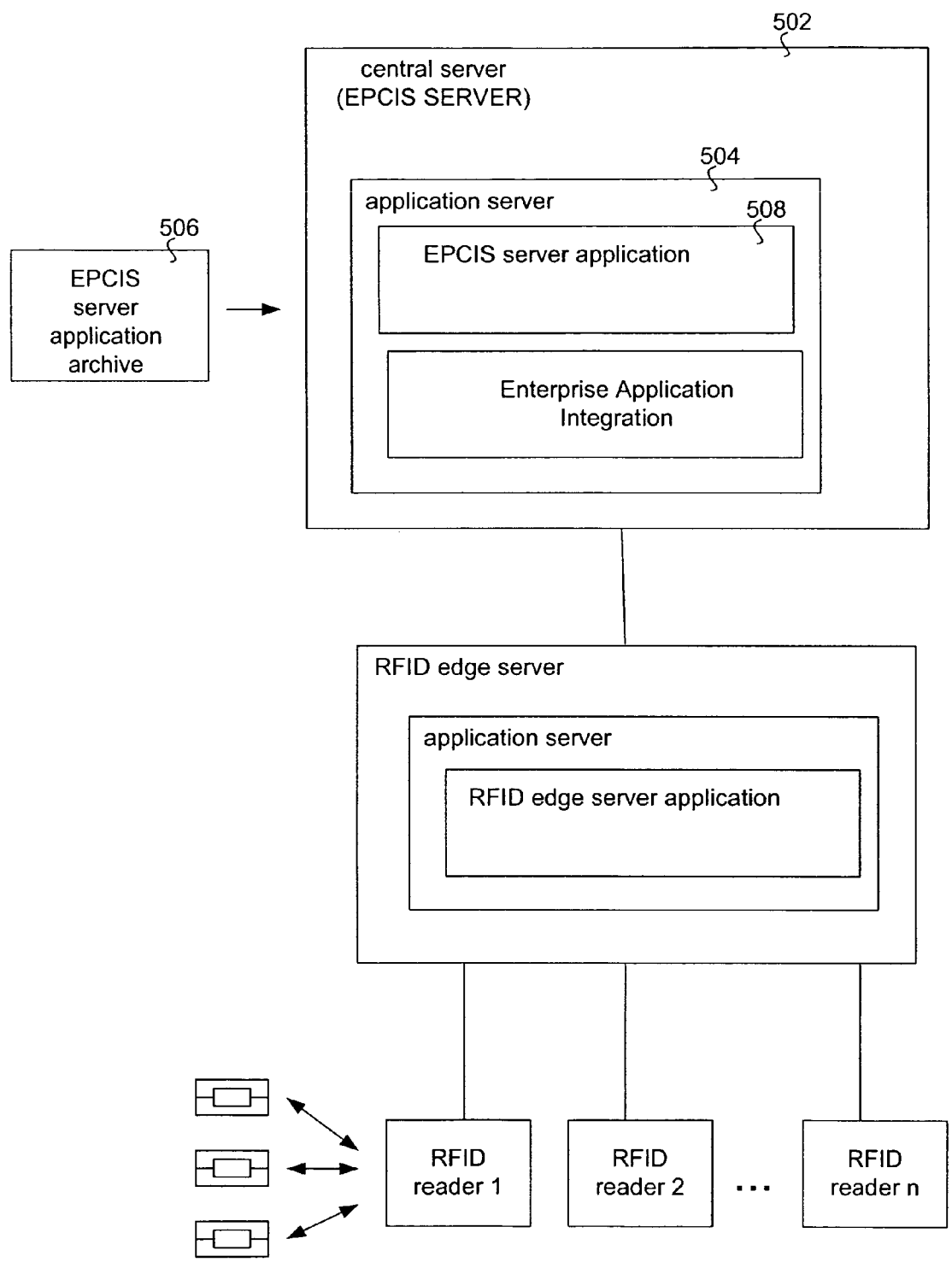
FIG. 5 is a diagram that illustrates an EPCIS server application archive, which allows the EPCIS server application to be deployed in a standards compliant way quickly into a standard J2EE Application Server.

FIG. 5 illustrates an example in which EPCIS server 502 includes an application server 504 set up to receive an EPCIS software package as an archive file 506 and to open archive file to install the EPCIS software 508 into the application server 504. The EPCIS archive file can be a standard archive file such as a JAR file. The use of an EPCIS server application archive 506 can make it easier to obtain and maintain the EPCIS software 508.

On embodiment of the present invention is a method including at an EPCIS server 502, receiving EPCIS software packaged into an archive file 506, and opening the archive file 506 to install the EPCIS software 508 into the application server 504. Additionally, the present invention can comprise a computer readable medium including code adapted to do the steps of the method.

Figure 6:
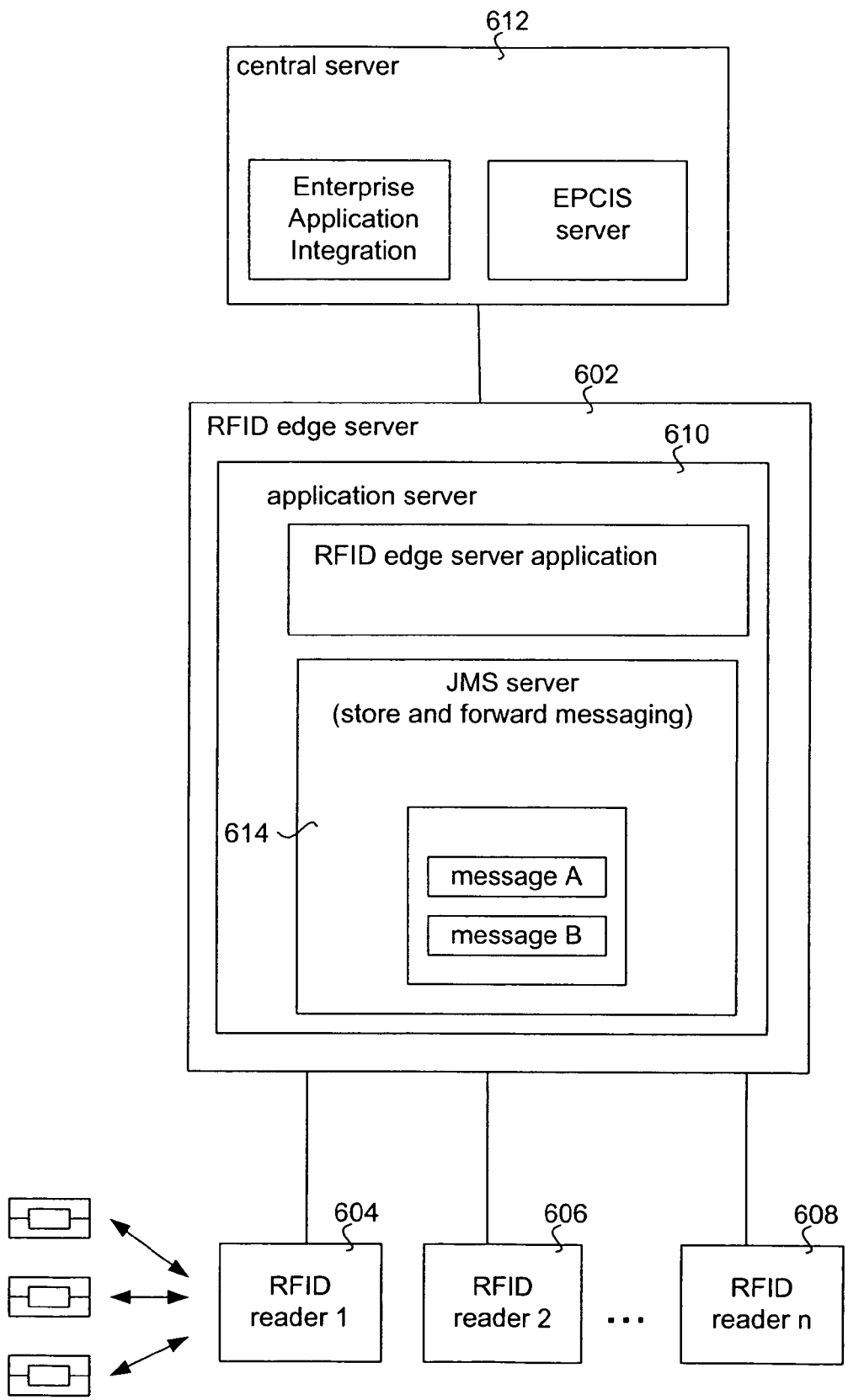
FIG. 6 is a diagram that illustrates the store and forward of messages from the RFID edge server to a notification recipient.

FIG. 6 illustrates an example of an RFID edge server 602 is associated with a multiple RFID readers 604, 606 and 608. The RFID edge server 602 can include an application server 610 adapted to do store-and-forward messaging to a central server 612. A store-and-forward messaging unit can maintain copies of messages sent to the central server 216 until conformation of the messages is received from the central server 612

Additionally, store and forward messaging can operate in as part of a transaction in which case the message is stored after forwarding until any transaction including the message completes. In one embodiment, the transactional messaging uses a two-phase commit, such as with XA messaging, to ensure that either all updates are done or all the updates are rolled back.

In one embodiment, store and forward messaging is implemented using a JMS server 614. In one embodiment, the JMS server operates in a transactional manner and transactions involving the messages can be rolledback.

The Java Message Service is a Java API that allows applications to create, send, receive, and read messages. The JMS API defines a common set of interfaces and associated semantics that allow programs written in the Java programming language to communicate with other messaging implementations.

The JMS API enables communication that is not only loosely coupled but also

Asynchronous. A JMS provider can deliver messages to a client as they arrive; a client does not have to request messages in order to receive them.

Reliable. The JMS API can ensure that a message is delivered once and only once. Lower levels of reliability are available for applications that can afford to miss messages or to receive duplicate messages.

In one embodiment, a message, such as message A, is sent to the central server 216 and the RFID edge server 602 maintains a copy of message A until an acknowledgment from the central server 216, or a determination that a transaction including the Message A is completed.

In one embodiment of the present invention a method wherein a RFID edge server 602 receives data from multiple RFID readers 604, 606 and 608. At the RFID reader 602, store and forwarding of messages including at least some of the data is done to the central server 612. A computer readable medium implementing such a method can be used.

Figure 7:
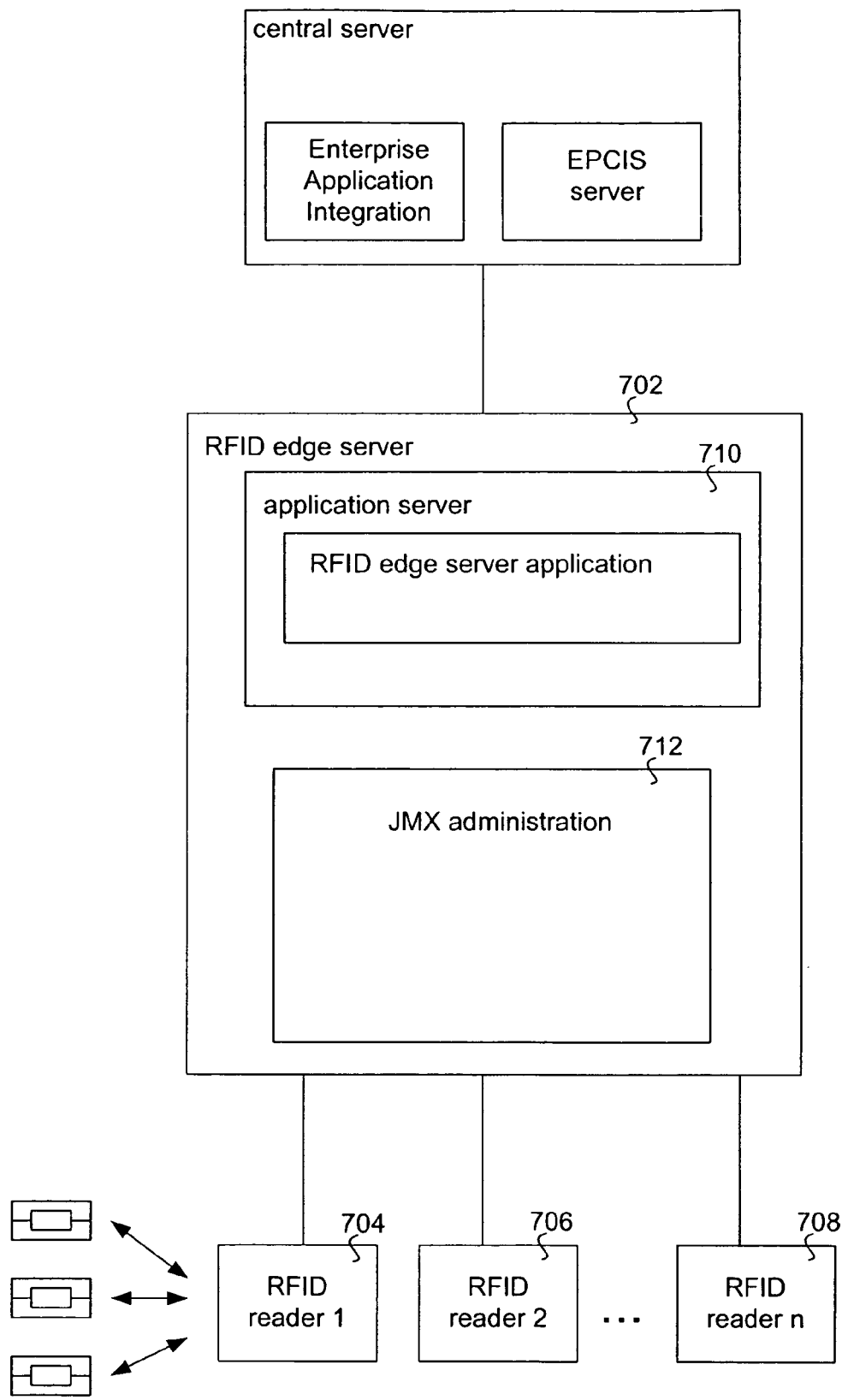
FIG. 7 is a diagram that illustrates JMX administration at a RFID edge server.

FIG. 7 illustrates an RFID edge server application server 702 associate with multiple RFID readers 704, 706 and 708. The RFID edge server 702 can include an application server which is adapted to use JMX administration 712, or some other J2EE standards-based administration.

The JMX administration 712 can be used to manage resources related to the RFID edge server. Java Management Extensions (JMX) can use managed beans, or MBeans. An MBean is a managed Java object, similar to a JavaBean™, that follows the design patterns set forth in the instrumentation level of the JMX specification. An MBean can represent a device, an application, or any resource that needs to be managed. MBeans expose a management interface: a set of readable and/or writable attributes and a set of invokable operations, along with a self-description. The management interface does not change throughout the life of an MBean instance. MBeans can also emit notifications when certain defined events occur.

The JMX administration 712 can use MBeans to set configuration for the RFID edge server. An administration server at the RFID edge server 702 can be used to set the configuration of the RFID edge server. The administration server can be run on the application server. An administration console can be used to manage the RFID edge server 702. The administration console can include a graphical interface for determining and setting the state and configuration of the RFID edge server.

The RFID edge server of claim 1, wherein the JMX administration can be used to manage the connections with the multiple RFID readers. The JMX administration can be used to manage the RFID edge server remotely.

Figure 8:
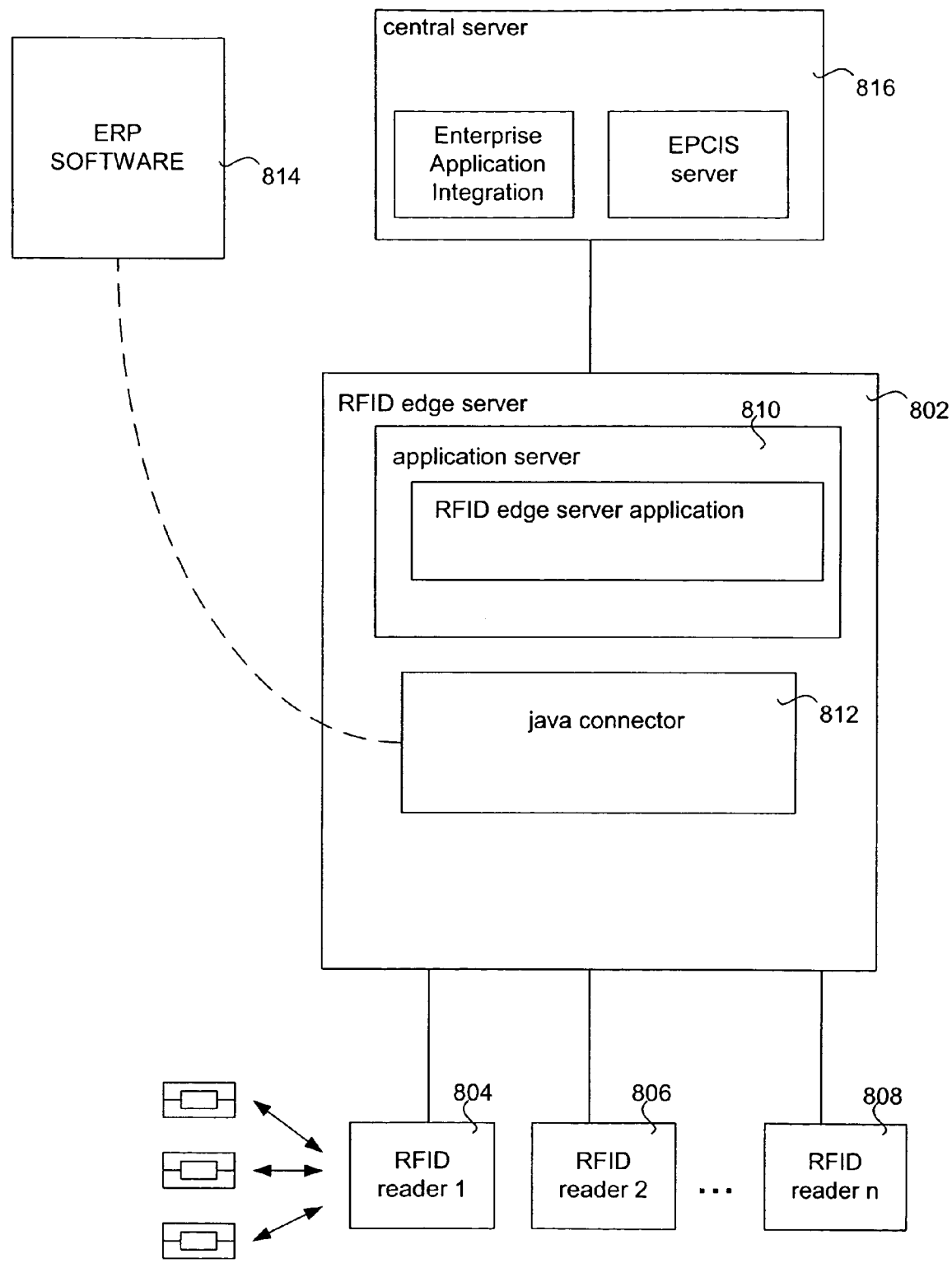
FIG. 8 is a diagram that illustrates the use of in-process Java connector to connect the RFID edge server to legacy/$3^{rd}$ party software.

FIG. 8 shows one embodiment of the present invention which an RFID edge server 802 is used to associate with multiple RFID readers 804, 806 and 808. RFID edge server 802 includes an application server 810 using a Java connector 812. The Java connector can be used to communicate with ERP software 814.

The J2EE Connector (Java connector) architecture defines a standard architecture for connecting the J2EE platform to heterogeneous (Enterprise Information Systems) EIS systems. Examples of EIS systems include ERP, mainframe transaction processing, database systems, and legacy applications not written in the Java programming language. The J2EE Connector (Java connector) architecture defines a set of scalable, secure, and transactional mechanisms to enable the integration of EISs with application servers and enterprise applications.

The J2EE Connector architecture enables an EIS vendor to provide a standard resource adapter for its EIS. The resource adapter plugs into an application server, providing connectivity between the EIS, the application server, and the enterprise application. An EIS vendor needs to provide just one standard resource adapter which has the capability to plug in to any application server that supports the J2EE Connector architecture.

Multiple resource adapters (that is, one resource adapter per type of EIS) are pluggable into an application server. This capability enables application components deployed on the application server to access the underlying EIS systems.

The Java connector 812 can connect to ERP software at another location. RFID edge server also communicates with an EPCIS server.

Device management functions of the RFID edge server can include Health Monitoring & Diagnostics, Fault Management, Tag Activity Monitoring, Performance Analysis, Analytics to determine underperforming components, Maintenance & Upgrades, Version Control, Firmware & Software upgrades, Provisioning & Configuration, and Web based configuration.

Figure 9:
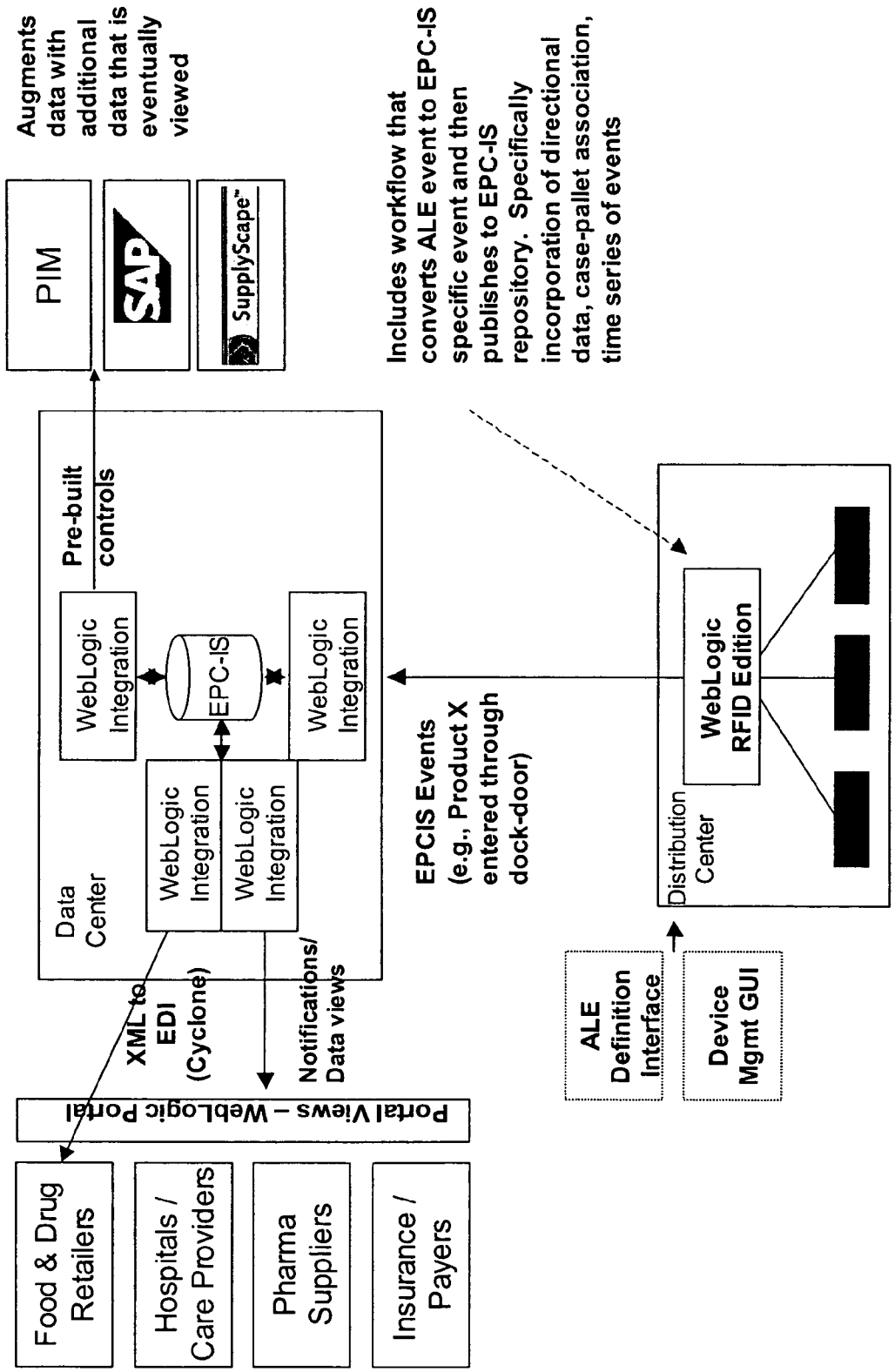
FIG. 9 is a diagram that illustrates an exemplary system of one embodiment.

FIG. 9 shows an exemplary system of one embodiment. An application server at a distribution center can run application(s) including an ALE definition interface, A device management GUI and workflows to convert ALE events to EPCIS specific events that can be published to an EPCIS repository. A data center can include integration software to integrate with ERP software and provide data to web sites which can use a portal product.

Figure 12:
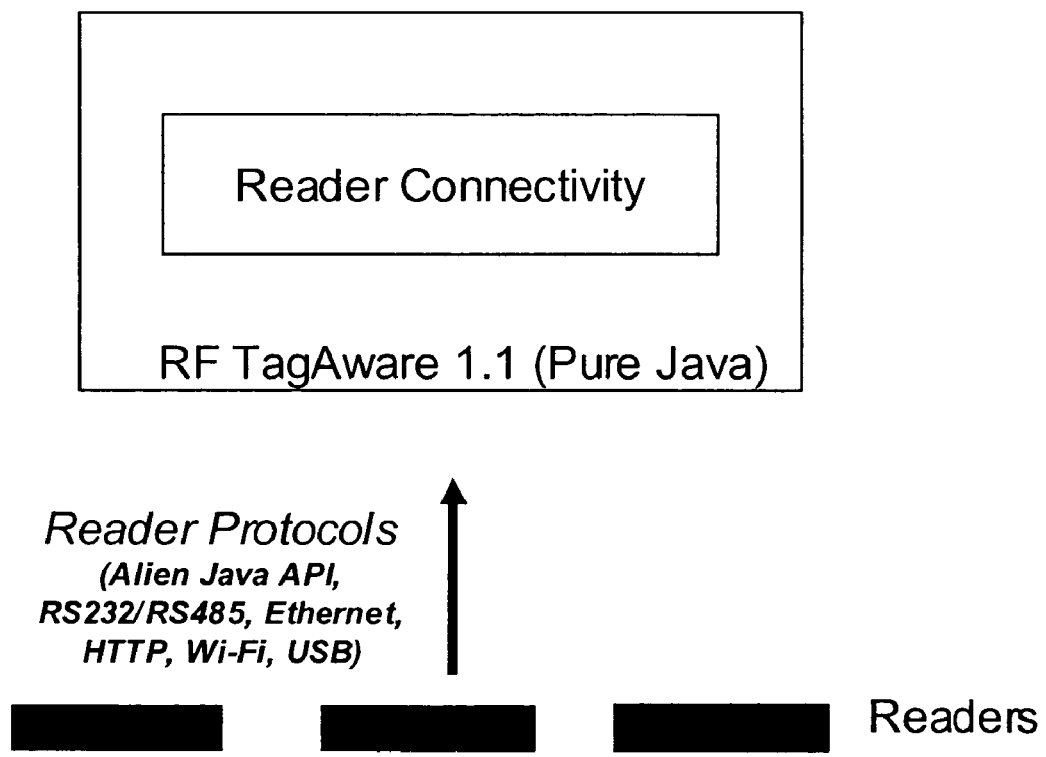
FIG. 12 is a diagram that illustrates reader connectivity.

FIG. 12 illustrates the use of reader connectivity software that can be run at an application server at an RFID edge server. A number of different reader protocols can be supported which can allow a single RFID edge server interact with multiple different types of RFID readers.

The use of the systems of the present invention can have a number of advantages.

1) Scalability—RFID systems can have hundreds of RFID readers each reading data hundreds of times a second. This can cause CPU utilization, network bandwidth, and/or data repository constraints. A number of features can help this problem including: Thread Multiplexing, "Non-blocking" IO, Eliminating duplicates through ALE, "Boxcarring" packets and Handling data storage at the Enterprise Application Integration (EAI) layer.

2) Availability—Availability of the system can be improved by reducing dependency on the database at the edge and ensuring availability of integration/server layer. In one embodiment, a file system and not a database is used at the RFID edge server. A database can be used at an integration layer, such as at a central server. Load balancers can be used as well as high-availability messaging through clustered JMS servers. A clustered database can be used to back" the integration/server layer.

3) Security—Administration should be secure to prevent readers from being turned off and items being stolen. The administrative interface can be protected by authentication, authorization, audit, and potentially over SSL (Secure Socket Layer). This SSL "handshake" can be very CPU intensive. Alternately, the entire stack (reader/edge/server) can be wrapped in a firewall to enable perimeter authorization. The RFID system security can be plugable to $3^{rd}$ party security providers.

4) Interoperability—Interoperability can include interoperability with packaged applications and with readers, Support for standards-based JCA Adapters. Reader abstraction layer at the edge that readily facilitates device drivers additions and updates.

5) Integration Layer—The Global view is difficult to support due to different readers and "edge-server" formats. Complex event composition is costly and not suitable at CPU intensive edge (transformation and duplicate elimination). The RFID edge-server need not be designed to integrate with other components of an integrated software platform. A unifying EAI layer can be used to compose and correlate events from different sets of RFID infrastructure. Clustered integration servers can be used to absorb the load of complex event composition. The EAI product can be fully integrated with Business Process Management (BPM) and Portal.

6) Administration—Different administration consoles from different components can prevent a centralized administration. RFID components can integrate with existing management vendors (HP Openview, Tivoli) and can support protocols like SNMP & JMX.

7) Messaging—Once RFID becomes mission critical there can be a need to ensure messages are sent once and only once. The JMX embodiment can support "exactly once" semantics. Transaction can guarantee on message enqueue & dequeue. The RFID edge server can provide asynchronous JMS support.

Figure 13:
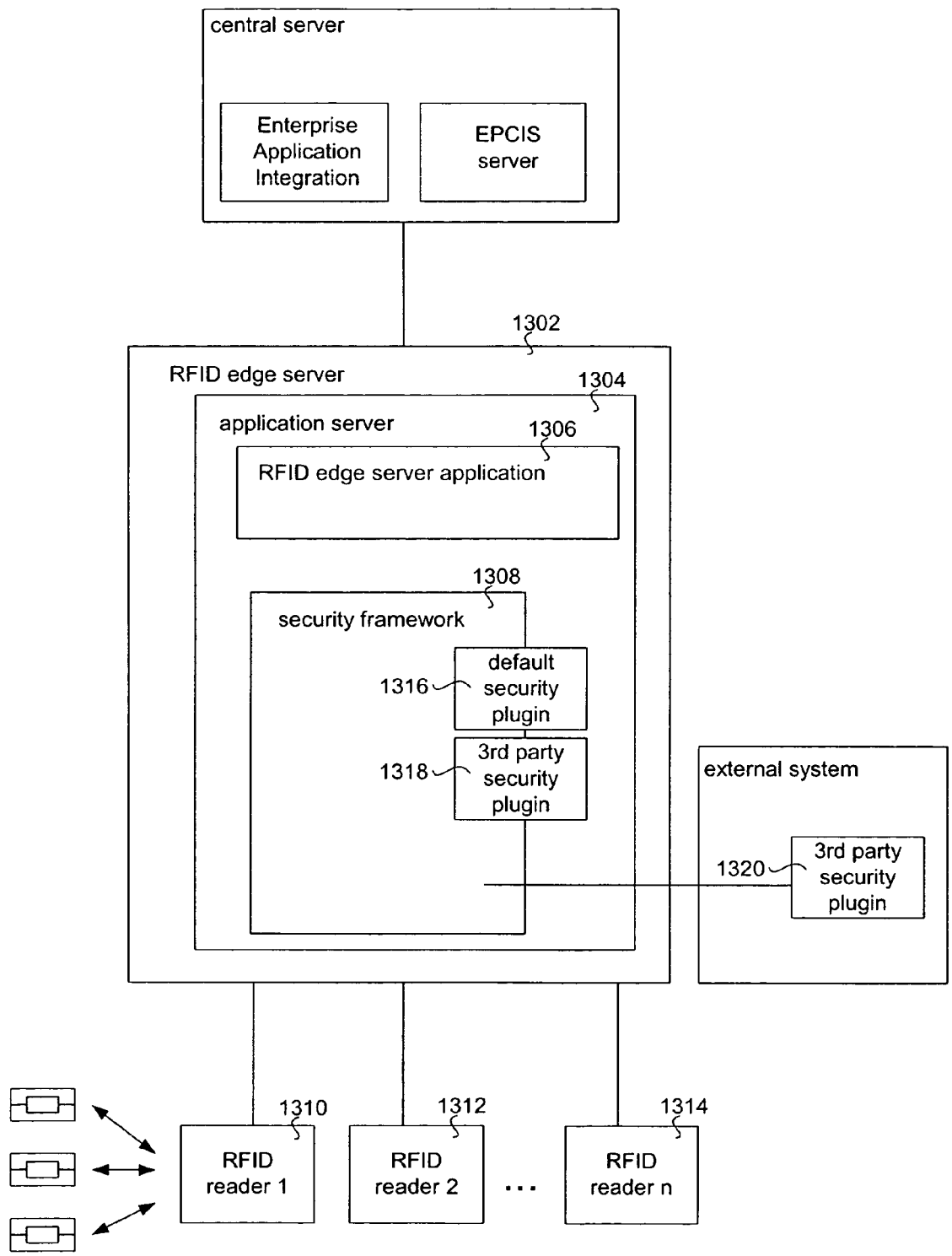
FIG. 13 is a diagram that illustrates an RFID edge server with security plug-ins.

FIG. 13 shows an RFID edge server 1302. The RFID edge server 1302 can include an Application server 1304. The application server 1304 can run an RFID edge server application 1306. The application server 1304 can include, or have associated, with it a security framedwork 1308 that can control the security for the RFID edge server application 1306. The security framework 1308 can ensure that the RFID edge server is not tampered with using rules and entitlements. This can prevent the RFID readers 1310, 1312, and 1314 from being turned off or the RFID data erased which could facilitate stealing from a warehouse, for example. The security framework 108 can also ensure that an audit is not modified by any user.

The security framework 1308 can also provide an API for connecting to security plugins 1316, 1318, and 1320 that can allow third party security to operate using the known features and user interface. The security plugin can be code internal to the RFID edge server 1302 or can be code external to the RFID edge server 1302. The security framework 1308 translates the security selections from a security plugin to security for the RFID edge server application 1306. The security framework 1308 (and thus any of the security plugins 1316, 1318, and 1320) can have default settings for the RFID edge server application 1306.

The Security Framework can provide end-to-end application security, covering J2EE and non-J2EE components of an application hosted on an application server.

In one embodiment:
1. Security policies can be created and managed by Security Administrators.
2. Security policies can be flexible, dynamic, powerful rules that can be changed without recoding and redeployment.

Integration with existing security solutions is greatly simplified. The Security Framework can separate application business logic from the security code. Security services, including security business rules, can be provided by the infrastructure and don't have to be coded in the application. A user interface for security administration can be provided out-of-the-box.

A built-in dynamic security rules engine can makes it easy to implement dynamic business rules for security policies, and does not require any downtime to update these rules. It can allow mapping company business rules to security policies in distributed deployments, providing easy customization of application security to business requirements.

With an API, such as an open Security Service Provider Interface (SSPI), the framework can allow third party security solutions on the market to plug in and provide their security services to applications running on the application server, and also enables adding custom extensions.

Single Sign-On can be automatically available to applications on the application server without any additional programming.

The Security Framework can provide interfaces to other products, J2EE containers, and customer applications, and delegates requests to the appropriate security plug-in. Default security plug-ins can perform the following functions out-of-the-box:

Authentication: Can authenticate, verify, and map security tokens to an internal format for security support. Can support delegated username/password and certificate authentication with the application server, and HTTP certificate authentication via the standard service provided in a Web server.

Authorization: Can enforce authorization policies for resources, taking business policies into consideration. Can support role-based authorization, in which access is based on job function and business rules.

Auditing: Can Audit all security actions in support of non-repudiation. Provides a customizable set of data for auditing security events such as failed login attempts, authentication requests, rejected digital certificates, and invalid roles.

Public key infrastructure: Can support standard public key encryption for data or digital signatures, or when electronic authentication of a client's identity is required.

Credential mapping: Can map a user's authentication credentials to those required for legacy applications, so that the legacy application gets the necessary credential information.

Role mapping: Can map roles to users or groups, based on policy. Can determine the appropriate set of roles granted to an application server user or group for a resource.

The security plug-in scheme can be based on a set of Security Service Provider Interfaces (SPIs) for the plug-in points. The Security SPIs can be used by customers or third-party vendors to develop security plug-ins for the WebLogic Server environment. Security SPIs can be available for authentication, authorization, auditing, credential mapping, role mapping, and the public key infrastructure (supporting the Java standard Key Store for encrypted storage of public and private encryption keys).

An open, interface-based security architecture allows use of existing security products while taking advantage of new security technologies available in the marketplace. With this architecture, a security installation can support security vendors' full value propositions, not just a subset. A user's choice of security products can be "mixed and matched" to create complete custom security solutions. In fact, the application server can run more than one security plug-in for a given function, and users can set constraints that govern which product or protocol will be used in a given situation.

As users integrate new solutions or modify existing ones, administrators can set security policy for each security plug-in, using a built-in menu-driven policy tool. Security policy can govern authorization: the rules and constraints for accessing resources or assuming roles. More than one security plug-in can run concurrently, as part of a migration or transition scheme, and set security policy accordingly. An Adjudicator function can resolve any conflicts in interpretation when making authorization decisions.

The security framework can support any choice of vendors and protocols because it separates the details of the security system from application code, simplifying application maintenance and management. Changing security system components or policies need not entail modifying applications. This unified architecture makes it easy to integrate best-of-breed security solutions, and to replace components of a security system with the latest technologies from third-party vendors, or from a development staff. The ability to swap in new security plug-ins and technologies as needed reduces the total cost of ownership and maximizes the return on investment in security technologies.

The security framework can organize users into users and groups that take on roles according to defined security policies. Users can be organized into groups. Groups can be used to represent organizational boundaries as well as to simplify administration. Each application user and group is mapped to a role dynamically during application execution, when authorization is needed.

Roles and policies can determine access to system resources, and permitted behaviors. User roles can be registered by an administrator using the built-in menu-driven security policy tool embedded in the BEA-supplied Authorization plug-in. The security policy tool's interface can reflects business concepts, not programming concepts, and allows an administrator to create simple prose-based rules for dynamically assigning roles and calculating access privileges. Application developers are freed from having to write application code to implement complex business policies, because the policy tool separates the tasks of business policy creation and application creation.

The roles that a user can be assigned to are determined by policies defined by the administrator, on behalf of the company. Since policies reflect business security rules, a company's management can set security policies rather than the software development staff. Security policies can easily be changed with changes in business conditions.

The role-and-policy-based security scheme can replaces the previous scheme of users, groups, and access control lists (ACLs), and can offers clear advantages for ease of administration and ease of adaptability as security requirements change. Using roles and policies for authorization permits dynamic computation of access status for each resource, for each user or group.

Figure 14:
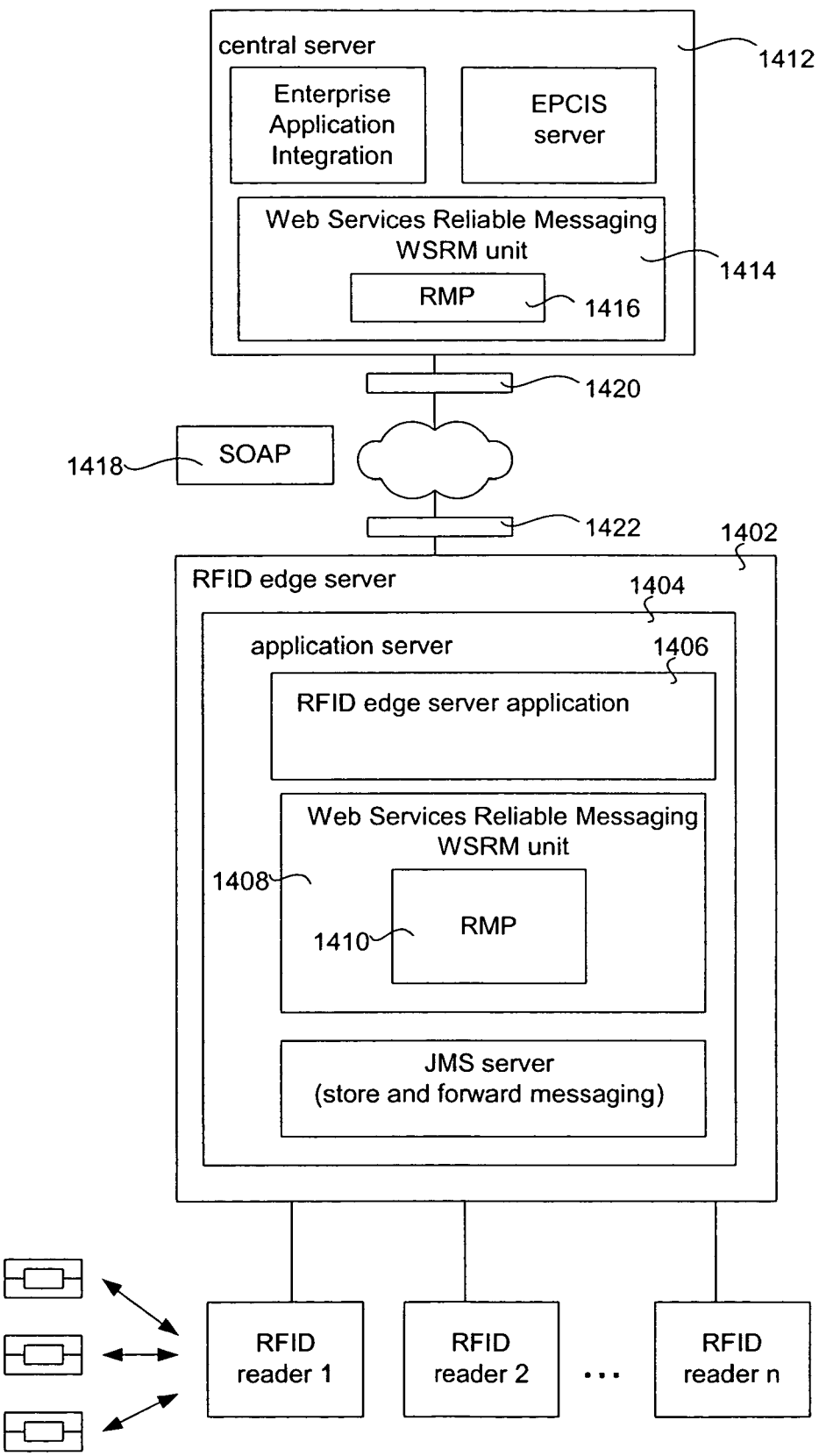
FIG. 14 is a diagram that illustrates an RFID edge server with WSRM.

FIG. 14 shows an RFID edge server 1402. The RFID edge server 1402 includes an application server 1404 that can run on RFID edge sever application 1406. The application server 1404 can include a web service reliability messaging (WSRM) unit 1408 that can includes a Reliable Messaging Processors (RMPs) 1410. The WSRM can send messages in a reliable manner between the RFID edge server 1402 and the central server 1412. The central server 1412 can have its own WSRM unit 1414 with its own RMP 1416. WSRM uses Simple Object Access Protocol (SOAP) messages 1418 and pass through the normally configured firewalls 1420 and 1422 because they use HTTP. The SOAP messages can contain the RFID data from the RFID edge server 1402.

WSRM can be used to send messages in a service oriented architecture (SOA) system, such as an SOA system using a service bus and service registry.

In one embodiment, the RFID edge server outbound notifications are transmitted using Web Service Reliable Messaging (WSRM). WSRM is an open specification for ensuring reliable message delivery for Web services. WSRM can send messages using the Simple Object Access Protocol (SOAP). SOAP is a simple XML-based protocol to let applications exchange information over HTTP. HTTP messages are often allowed through firewalls, so WSRM can allow reliable messaging in a format that can pass through most firewalls In one embodiment, WSRM utilizes a transactional messaging system in the implementation.

Reliability, can include the ability to guarantee message delivery to "users" with a chosen level of protocol capability and Quality of Service (QOS). Again, the users can be either other WS protocols (e.g. WS Security, WS Distributed Management, WS-Notifications, etc), or Application layer/user information messages which are exchanged between the end points of the connection.

To facilitate WS Reliability, SOAP based Reliable Messaging Processors (RMPs), in the sender and in the receiver endpoints can be used. For example both the RFID edge server and the central sever can have RMPs. The RMPs can work together to ensure that messages are delivered in a reliable manner over a connection that may be inherently unreliable. The sender and receiver RMPs can operate on newly defined SOAP headers that are transmitted as either self contained messages, or they can be attached to other WS protocol messages or user data messages (all of which are SOAP/XML encoded). Fault messages may extend to the SOAP message body.

The "users" can determine the level of WS Reliability. Reliability may include one or more reliable messaging protocol capability for the delivery of WS messages Guaranteed delivery to the user or Application entity (the message is persisted (i.e. stored in non-volatile memory) in the sender RMP until delivery to the ultimate receiver has been acknowledged. Either a message is delivered, or the sending application is notified of a delivery failure. A resending mechanism controlled by acknowledgements and handled by RMPs, can overcome occasional connection failures or message loss.

Duplicate elimination—Delivery at most once—with duplicates detected and eliminated by the RMP receiver. Duplicate messages could be generated accidentally by some network component (e.g. a router), or intentionally by a resending mechanism. In both cases, it is critical for applications that require only a single instance of the message be delivered, independent of how much time elapsed between the reception of a message and its duplicate.

Guaranteed message ordering—when delivered by the RMP receiver to the user, the messages can be properly sequenced, in the same order as they were sent. The problem arises when messages are received out of sequence or were resent when acknowledgements are lost. The RMP reorders the messages before delivery to the application, waiting for delayed messages to arrive. (Solution: RMP transmitter retransmits unacknowledged messages—after a time-out—and the RMP receiver re-orders received out of sequence messages so that they are properly delivered to the user/Application entity)

The users of the WS Reliability protocol may agree upon any or all of the above message delivery capabilities. Different users or applications may choose different protocol capabilities, which are conveyed to the RMP sender and receiver prior to initiating communications. Alternatively, the receiver RMP can determine the protocol capability via explicit parameter values sent in each reliable message request.

For purposes of the WSRM TC, QOS can be defined as the ability to determine at least some of the following aspects:

Message persistence (ability to store a message until it is reliably delivered to the Application).

Message acknowledgement (by the receiver and resending (by sender on No Ack time-out).

Ordered delivery of messages (by use of Sequence numbers).

Delivery status awareness for both sender and receiver (via state saving and status check-pointing).

The WSRM specification can define extensions to SOAP Headers. It is assumed that the payload (user information) is specified using a WSDL description (fault messages may also use the payload to convey fault code information).

In the Reliable Messaging Model, the sender node can send a message to the receiver node (i.e., intermediaries are assumed to be transparent in the WS Reliability specification). Upon receipt of the message and at the appropriate time, the receiver node sends back an Acknowledgment message or Fault message to the sender node.

There are three ways for the receiver to send back an Acknowledgment message or a Fault message to the sender. These are referred to as the "RM Reply patterns," which are defined as follows:

Response RM-Reply Pattern A Response RM-Reply pattern can be in use if the outbound Reliable Message is sent in the underlying protocol request, and the resultant Acknowledgment message (or Fault message) is contained in the underlying protocol response message which corresponds to the original request. In essence, the Acknowledgement is "piggybacked" onto the business response message.

Callback RM-Reply Pattern A Callback RM-Reply pattern can be in use if the Acknowledgment message (or Fault message) is contained in an underlying protocol request of a second request/response exchange (or a second one-way message), operating in the opposite direction to the message containing the outbound Reliable Message.

Polling RM-Reply Pattern The Polling RM-Reply pattern can be used if a second underlying protocol request is generated, in the same direction as the one containing the outbound Reliable Message, to act as a "request for acknowledgment." The Acknowledgment message (or Fault message) is contained in the underlying protocol response to this request. This polling pattern can be used in instances where it is inappropriate for the sender of reliable messages to receive underlying protocol requests e.g. the sender behind a firewall.

These three reply patterns provide "the users" with flexibility to send reliable request/response or one-way SOAP messages (Callback and Polling patterns). Callback is important for one-way request message patterns and for batching of acknowledgements and fault messages.

Additionally, "polling" enables reliable message delivery to extend beyond the firewall, which might otherwise block external reliable messages from reaching the intended recipient. Polling makes it possible to use the WS Reliability protocol, even when a firewall prevents 3rd parties from initiating messages or requests.

WS Reliability Protocol Capabilities:

Three types of message delivery capabilities are defined in the WS Reliability protocol. One or more of these protocol capabilities may be used with each of the RM Reply patterns. The selection is dependent on prior end user agreements or explicitly inferred by the receiver RMP from request messages.

Guaranteed Delivery

This is to successfully deliver a message from a sender RMP to a receiver RMP without failure; if this is not possible, to report the failure to the sender's application. To realize guaranteed delivery, the message is persisted (i.e. stored) in the sender RMP until delivery to the receiver is acknowledged, or until the ultimate failure is reported to it's requester. (There is a requirement on the underlying transport protocol that the message MUST be transported without corruption.) If message persistence is lost for any reason, it is no longer possible to guarantee message delivery. Since the reliability of message persistence is a property of the system implementation, the conditions under which guaranteed message delivery holds is also a property of the system implementation.

Duplicate Elimination

A number of conditions may result in transmission of duplicate message(s), e.g. temporary downtime of the sender or receiver, a routing problem between the sender and receiver, etc. In order to provide at-most-once semantics, the ultimate RMP receiver can eliminate duplicate messages and never present them to the user. Messages with the same Message Identifier value can be treated as duplicates and not delivered to the application.

Guaranteed Message Ordering

Some applications will expect to receive a sequence of messages from the same sender in the same order those messages were sent. Although there are often means to enforce this at the Application layer, this is not always possible or practical. In such cases, the Reliable Messaging layer is required to guarantee the message order. WRSM defines a model to meet this requirement.

When the sender application sends three messages (1), (2), and (3) with Guaranteed Message Ordering, the receiver's RMP can guarantee that message order when it makes those messages available to the receiver's application (the user). When a receiver's RMP receives messages (1) and (3), the receiver's RMP can make message (1) available to the application, but it persists message (3) until message (2) is received. When receiver's RMP receives message (2), it can then makes message (2) and (3) available to the application, in that order.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nano systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A Radio Frequency Identification (RFID) edge server to associate with multiple RFID readers at a location, the RFID edge server including an application server using a security framework, the security framework allowing for the use of a plug-in security module, wherein the security framework is such that the security framework uses an Application Programming Interface (API) that allows for the use of a default plug-in security module and a third party plug-in security module, the third party plug-in security module having a different design from the default plug-in security module, wherein the plug-in security module for the application server of the RFID edge server prevents the RFID edge server from being tampered with by unauthorized user.

2. The RFID edge server of claim 1, wherein the RFID edge server is adapted to filter communications from the RFID readers.

3. The RFID edge server of claim 1, wherein the RFID edge server and at least some of the RFID readers are interconnected using a local network.

4. The RFID edge server of claim 1, wherein security framework ensures auditing.

5. A computer readable storage medium includes code to implement an application server using a security framework for an RFID edge server, the security framework allowing for the use of a plug-in security module, wherein the security framework is such that the security framework uses an API that allows for the use of a default plug-in security module and a third party plug-in security module, the third party plug-in security module having a different design from the default plug-in security module, wherein the plug-in security module for the application server of the RFID edge server prevents the RFID edge server from being tampered with by unauthorized user.

6. A computer readable storage medium of claim 5, wherein the security plug-in prevents the RFID edge server application from being tampered with by unauthorized users.

7. A computer readable storage medium of claim 5, wherein the RFID edge server is adapted to filter communications from the RFID readers.

8. A computer readable storage medium of claim 5, wherein the RFID edge server and at least some of the RFID readers are interconnected using a local network.

9. A computer readable storage medium of claim 5, wherein security framework ensures auditing.

* * * * *

UNITED STATES PATENT AND TRADEMARK OFFICE
CERTIFICATE OF CORRECTION

PATENT NO. : 7,394,377 B2  Page 1 of 1
APPLICATION NO. : 11/256767
DATED : July 1, 2008
INVENTOR(S) : Banerjee It is certified that error appears in the above-identified patent and that said Letters Patent is hereby corrected as shown below:

In column 1, line 61, delete "IO" and insert -- I/O --, therefor.

In column 5, line 48, delete "IO," and insert -- I/O, --, therefor.

In column 7, line 36, after "612" insert -- . --.

In column 7, line 47, delete "rolledback." and insert -- rolled back. --, therefor.

In column 9, line 13, delete "interface, A" and insert -- interface. A --, therefor.

In column 12, line 55, delete "firewalls In one" and insert -- firewalls. In one --, therefor.

In column 13, line 12, after "messages" insert -- . --.

In column 13, line 41, after "entity)" insert -- . --.

In column 13, line 66–67, delete "specification) ." and insert -- specification). --, therefor.

In column 14, line 7–14, delete "A Response.........................................message." and insert the same on Col. 14, Line 8, Below "Pattern" as a new paragraph.

In column 14, line 15–20, delete "A Callback................................Message." and insert the same on Col. 14, Line 16, Below "Pattern" as a new paragraph.

In column 14, line 21–30, delete "The Polling................................firewall." and insert the same on Col. 14, Line 22, Below "Pattern" as a new paragraph.

Signed and Sealed this

Ninth Day of February, 2010

David J. Kappos
*Director of the United States Patent and Trademark Office*